No. 821,433. PATENTED MAY 22, 1906.
H. T. RAILSBACK.
DRAFT EQUALIZER.
APPLICATION FILED SEPT. 12, 1905.
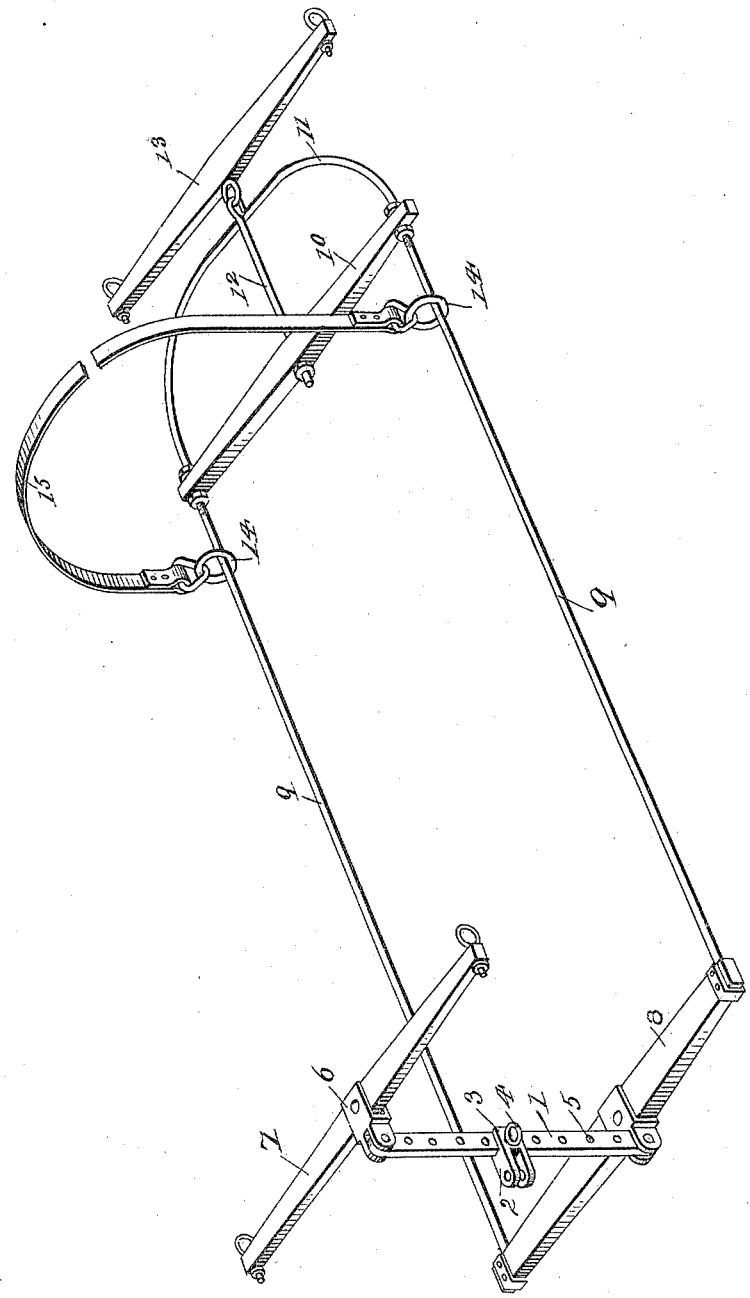
Inventor
H. S. RAILSBACK.
Witnesses
W. R. Taylor.
Herbert D. Lawson.
By W. J. FitzGerald & Co.
Attorneys

UNITED STATES PATENT OFFICE.

HUBERT T. RAILSBACK, OF MOUNTAIN VIEW, OKLAHOMA TERRITORY.

DRAFT-EQUALIZER.

No. 821,433.　　　　　Specification of Letters Patent.　　　　Patented May 22, 1906.

Application filed September 12, 1905. Serial No. 278,157.

*To all whom it may concern:*

Be it known that I, HUBERT T. RAILSBACK, a citizen of the United States, residing at Mountain View, in the county of Kiowa and Territory of Oklahoma, have invented certain new and useful Improvements in Draft-Equalizers; and I do hereby declare the following to be a full, clear, and exact description of the invention, such as will enable others skilled in the art to which it appertains to make and use the same.

My invention relates to draft-equalizers; and its object is to provide a device of this character for equalizing the draft where two horses are placed one in front of the other. One of the great objections to the use of two-horse agricultural implements or machines for working the ground or planting after the crop has reached a certain height has been the fact that the horses trample or push down the vegetation, because the distance between the rows will not permit two horses to travel side by side without such damage resulting. Because of this objection it has been customary to employ only one horse under said conditions to pull a load which should be drawn by two horses.

The object of my invention is to provide an equalizer which can be connected to any form of agricultural machine and which permits two horses to be placed one in front of the other and at the same time equalizes the draft.

The invention consists of an equalizer-bar having a clevis for connecting it to the machine to be pulled, and a swingletree is connected to the upper end of this bar, while a light frame is pivotally connected to the lower end of the equalizer-bar and is of sufficient size to permit the horse which is harnessed to the swingletree to stand within said frame. Another swingletree is connected to the front end of this frame, and the lead-horse is adapted to be harnessed to it. It will therefore be seen that the pull exerted by the lead-horse will be transmitted to the equalizer-bar and thence to the swingletree of the horse standing within the frame.

The invention also consists of certain other novel features of construction and combination of parts, which will be hereinafter more fully described, and pointed out in the claims. The accompanying drawing, which is a perspective view of my improved equalizer, shows the preferred form of my invention.

Referring to said drawing by numerals of reference, 1 is an equalizer-bar adapted to be carried vertically by a clevis 2, which has a forked end 3 embracing the bar 1 and secured thereto by means of a pin 4, which is adapted to be placed in any one of a series of apertures 5, formed within the bar. This clevis is adapted to be connected in any desired manner to the machine to be pulled. A block 6 is pivoted to the upper end of bar 1 and has a swingletree 7 secured at its center thereto. A cross-bar 8 is pivotally connected to the other end of beam 1, and extending from the end of this bar are parallel rods 9, which extend through the ends of a front cross-bar 10 and are then bowed or curved in front of said bar, so as to form a fender for spreading apart any vegetable growths which may be contacted thereby. The two rods 9 may be separate or, as shown in the drawing, can be in one single length terminating at the ends of the cross-bar 8 and having its central portion constituting the fender 11. A rod 12 extends forward from the center of the front cross-bar 10, and another swingletree 13 is pivoted thereto at the center. The rods 9 extend loosely through rings 14, which are connected in any suitable manner to the ends of straps 15.

In using the device herein described the rear horse is placed within the frame formed by rods 9 and cross-bars 8 and 10 and is then harnessed to the rear swingletree 7. Straps 15 are then secured to said horse's harness, so that the front portion of the frame will be supported by him. The lead-horse is then harnessed to the front swingletree 13. From the foregoing it will be seen that the pull exerted by the lead-horse will be transmitted directly to the lower end of the equalizer-bar 1 and will cause the rear swingletree 7 to be pulled backward, and vice versa.

This draft-equalizer will, as hereinbefore stated, be found of great utility in pulling agricultural machines between rows of vegetable growths, particularly when said machines are of such weight as to require more than a single horse to pull them.

Having thus fully described my invention, what I claim as new, and desire to secure by Letters Patent, is—

1. A draft-equalizer comprising an equalizer-bar, a swingletree, a rigid device pivoted at opposite ends to said swingletree and one end of the equalizer-bar, there being a sufficient distance between the equalizer-bar and the swingletree to allow a draft-animal to stand therebetween, and a second swingletree movably connected to the other end of the equalizer-bar.

2. A draft-equalizer comprising an equalizer-bar adapted to be fulcrumed between its ends, a rigid frame movably connected to one end of said bar, said frame being sufficiently large to permit a draft-animal to stand therein, and swingletrees movably connected to the other end of the equalizer-bar and to the front end of the frame, respectively.

3. A draft-equalizer comprising an equalizer-bar adapted to be fulcrumed between its ends, a frame pivoted to said bar at one side of its fulcrum, said frame being sufficiently large to allow a draft-animal to stand therein, swingletrees pivoted to the equalizer-bar at the other side of its fulcrum and to the forward end of the frame, respectively, and a fender extending from the forward end of said frame.

4. A draft-equalizer comprising an equalizer-bar adapted to be fulcrumed between its ends, a frame pivoted to said bar at one side of its fulcrum, said frame being sufficiently large to allow a draft-animal to stand therein, swingletrees pivoted to the equalizer-bar at the other side of its fulcrum and to the forward end of the frame, respectively, a fender extending from the forward end of said frame, and supporting devices loosely engaging the sides of the frame and adapted to be fastened to the animal within the frame.

5. The combination with swingletrees disposed one in front of the other for use by draft-animals in tandem; of draft-equalizing means connecting said swingletrees, supporting means engaging one end of said equalizing means and adapted to be secured to the rear draft-animal, and a fender extending from the equalizing means.

6. The combination with swingletrees disposed one in front of the other for use by draft-animals in tandem; of draft-equalizing means connecting said swingletrees, and supporting means engaging one end of said equalizing means and adapted to be secured to the rear draft-animal.

In testimony whereof I have signed my name to this specification in the presence of the subscribing witnesses.

HUBERT T. RAILSBACK.

Witnesses:
   ANGUS W. RALSTON,
   M. V. VAN METER,
   O. J. LOGAN.